United States Patent
Chamouard et al.

Patent Number: 5,870,053
Date of Patent: Feb. 9, 1999

[54] METHOD AND SYSTEM FOR DETERMINING A MODULUS OF SPEED OF A CARRIER OF RADAR

[75] Inventors: Eric Chamouard, St Denis; Brice Monod, Moulineaux, both of France

[73] Assignee: Thomson-CSF, Paris, France

[21] Appl. No.: 882,392

[22] Filed: Jul. 10, 1997

[30] Foreign Application Priority Data

Jul. 12, 1996 [FR] France ................................ 96 08733

[51] Int. Cl.⁶ .................................................. G01S 13/90
[52] U.S. Cl. ............................................. 342/25; 342/115
[58] Field of Search ........................... 342/25, 105, 115, 342/192, 195

[56] References Cited

U.S. PATENT DOCUMENTS

| | | | |
|---|---|---|---|
| 4,462,032 | 7/1984 | Martin | 342/25 |
| 4,771,287 | 9/1988 | Mims | 342/25 |
| 4,908,625 | 3/1990 | Anthouard et al. | 342/25 |
| 5,160,931 | 11/1992 | Brown | 342/25 |
| 5,166,688 | 11/1992 | Moreira | 342/25 |
| 5,278,757 | 1/1994 | Hoctor et al. | 364/413.25 |
| 5,469,167 | 11/1995 | Polge et al. | 342/25 |
| 5,546,087 | 8/1996 | Martin Neira | 342/120 |

FOREIGN PATENT DOCUMENTS 0 406 877 A2  1/1991  European Pat. Off. .

*Primary Examiner*—John B. Sotomayor
*Attorney, Agent, or Firm*—Oblon, Spivak, McClelland, Maier & Neustadt, P.C.

[57] ABSTRACT

A method and system for determining a modulus of a speed of movement of a carrier of radar, including (a) illuminating a same zone on the ground laterally, with radar of the carrier, at times $t_1$ and $t_2$; (b) measuring respective distances $D_1$ and $D_2$ of the carrier to the same zone at the times $t_1$ and $t_2$, and Doppler frequency shifts $F_{d1}$ and $F_{d2}$ of respective echoes returned by the same zone during the times $t_1$ and $t_2$; and (c) deducing the modulus $|\vec{V}_h|$ of the speed of movement of the carrier based on a relationship $$|\vec{V}_h| = \sqrt{\frac{\lambda}{2(t_2 - t_1)} (D_1 \cdot F_{[d1} - D_2 \cdot F_{d2})}$$

with $\lambda$ being a wavelength of a radar wave transmitted by the radar. The method and system require neither the locking of the radar to the carrier nor a course drift of the carrier. In this way, precision is improved and it possible to obtain accurate imaging radar modes having images in which distances can be measured with precision. The method and system can use results obtained during radar imaging for calculating the modulus of the speed of movement of the carrier.

8 Claims, 2 Drawing Sheets

METHOD AND SYSTEM FOR DETERMINING A MODULUS OF SPEED OF A CARRIER OF RADAR

BACKGROUND OF THE INVENTION

1. Field of the Invention

The present invention relates to airborne radars or radars on board satellites.

When an airborne radar works in imaging mode (SAR or synthetic aperture radar), the fidelity of the image to reality depends on the precision with which the modulus of the speed of the radar carrier vehicle is known. Any lack of precision in the knowledge of the modulus of the speed of the radar results in a deformation of the image which adversely affects the measurements of distance made in this image. To obtain precise distance measurements on a radar image; it is therefore necessary to know the modulus of the speed of movement of the carrier with extremely great precision.

2. Description of the Prior Art

In the prior art, it is habitual to determine the speed of movement of the carrier, either by means of the radar itself, which then works in a specific mode of measurement of the speed vector of the carrier, this mode being different from the imaging mode and making use of the locking of the radar to its carrier, or by means of a distinct device of the radar such as a satellite navigation system (GPS) or, if its precision allows it, the inertial guidance unit.

It is proposed here to determine the modulus of the speed of movement of the carrier of a radar by means of the radar by itself, without bringing into play the locking of this radar with respect to its carrier, and independently of the drift of the carrier due to any cross-wind, in order to improve the precision of the measurement and avoid the need to use a system other than the radar itself.

SUMMARY OF THE INVENTION

An object of the present invention is a method to determine the modulus of the speed of movement of the carrier of a radar, said method consisting in:

illuminating one and the same zone of the ground laterally, with the radar, at two different instants $t_1$ and $t_2$, measuring the distances $D_1$ and $D_2$, and the Doppler frequency shifts $F_{d1}$ and $F_{d2}$ of the echoes returned by one and the same point of the zone of the ground observed during the two instants $t_1$ and $t_2$, and deducing the modulus $|\vec{V}_h|$ of the speed of movement of the carrier from the relationship:

$$|\vec{V}_h| = \sqrt{\frac{\lambda}{2(t_2-t_1)} (D_1 \cdot F_{[d1]} - D_2 \cdot F_{d2})}$$

$\lambda$ being the wavelength of the wave transmitted by the radar.

This method has the advantage of not bringing into play the locking of the radar with respect to its carrier, for it requires neither precise knowledge of the angle of aim of the radar with respect to the referential trihedron of the carrier, nor precise knowledge of the angle of drift of the carrier with respect to its path. The result thereof is an increase in the precision of the measurement.

BRIEF DESCRIPTION OF THE DRAWINGS

Other features and advantages of the invention shall emerge from the following description of a mode of implementation, given by way of an example. This description will be made with reference to the drawing, wherein.

MORE DETAILED DESCRIPTION

Figure 1:
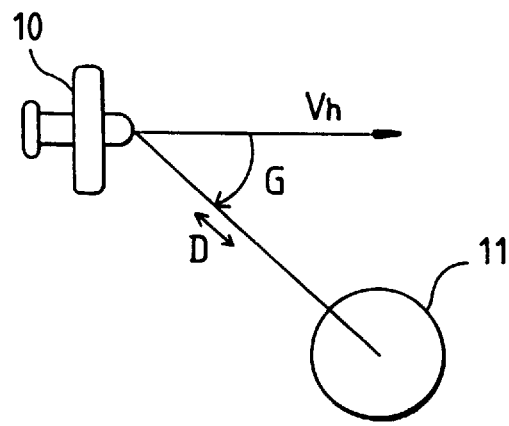
FIG. 1 is a drawing illustrating the way to illuminate a zone of the ground laterally by means of an airborne radar to take an image thereof.

A Doppler effect imaging device uses the dependency of the Doppler frequency as a function of the bearing or angular divergence of the zone aimed at with respect to the axis of movement of the carrier to form an image. The taking of the image is lateral because a radar in imaging mode is blind with respect to the axis of movement of its carrier. As can be seen in FIG. 1, it is assumed that the radar has been placed in the nose cone of an aircraft 10 that is moving above the ground at a horizontal speed $V_h$. The radar is aimed, laterally with respect to the aircraft 10, at a zone 11 to be mapped, located at a distance D, with a relative bearing G and an elevation angle —S. The echo sent back by the center of this zone 11 is assigned a delay τ proportional to its distance D and a frequency shift $F_d$ due to the Doppler effect verifying the relationships:

$$\begin{cases} D = \frac{c\tau}{2} \\ F_d = \frac{2V_h \cdot \cos(G) \cdot \cos(-S)}{\lambda} \end{cases} \quad (1)$$

with:

—c, the speed of propagation of the microwaves of the radar,

—$\lambda$, the wavelength of the microwaves of the radar.

Let $\Delta V_h$ be the error committed on the estimation $\hat{V}_h$ of the horizontal speed of the carrier:

$$\hat{V}_h = V_h + \Delta V_h$$

If we consider two points $P_a$ and $P_b$ of an image at the same distance D, the same elevation angle —S and two distinct relative bearing values $G_a$ and $G_b$, it can be written that the apparent relative bearing $\hat{G}_a$ is related to the real relative bearing $G_a$ by the relationship:

$$\cos(\hat{G}_a) = \frac{V_h}{V_h + \Delta V_h} \cos(G_a)$$

for:

$$\cos(\hat{G}_a) = \frac{\lambda F_{da}}{2\hat{V}_h \cos(-S)} = \frac{\lambda F_{da}}{2V_h\cos(-S) \cdot \left(1 + \frac{\Delta V_h}{V_h}\right)}$$

and in the same way, the apparent relative bearing $\hat{G}_b$ is related to the real relative bearing $G_b$ by a relationship having the form:

$$\cos(\hat{G}_b) = \frac{V_h}{V_h + \Delta V_h} \cos(G_b)$$

Since the error on the horizontal speed of the carrier is small; it is possible to write:

$$\begin{cases} \cos(\hat{G}_a) \approx \left(1 - \frac{\Delta V_h}{V_h}\right) \cos(G_a) \\ \cos(\hat{G}_b) \approx \left(1 - \frac{\Delta V_h}{V_h}\right) \cos(G_b) \end{cases}$$

If we look at the distance r between the two points of the image, this distance is written as follows $$r = 2D \sin e \frac{G_a - G_b}{2} = D\sqrt{2 - 2 \cdot \cos(G_a - G_b)}$$

while the apparent distance $\hat{r}$ which is the only distance accessible by the measurement is expressed by:

$$\hat{r} = D\sqrt{2 - 2 \cdot \cos(\hat{G}_a - \hat{G}_b)} \quad (2)$$

The error $\Delta r$ made on the distance between the two points of the image:

$$\Delta r = \hat{r} - r$$

initially, assuming that the relative bearing values $G_1$ and $G_2$ are close and that the errors are small, is initially:

$$\Delta r \approx D \frac{\Delta V_h}{V_h} \left( \frac{1}{\tan(G_a)} - \frac{1}{\tan(G_b)} \right)$$

Indeed, since the angles $G_a - G_b$ and $\hat{G}_a - \hat{G}_b$ are small, their cosine may be replaced by their limited expansion, so that we have:

$$\begin{cases} \cos(\hat{G}_a - \hat{G}_b) \cong 1 - \frac{(\hat{G}_a - \hat{G}_b)^2}{2} \\ \cos(G_a - G_b) \cong 1 - \frac{(G_a - G_b)^2}{2} \end{cases}$$

We then get:

$$\begin{cases} \hat{r} \cong D(\hat{G}_a - \hat{G}_b) \\ r \cong D(G_a - G_b) \\ \Delta r \cong D(\hat{G}_a - G_a - (\hat{G}_b - G_b)) \end{cases}$$

Now:

$$\hat{G}_a = \arccos\left(\left(1 - \frac{\Delta V_h}{V_h}\right) \cos(G_a)\right) = \arccos\left(\cos(G_a) - \frac{\Delta V_h}{V_h} \cos(G_a)\right)$$

In expanding the arc cosine to the first order, we get:

$$\hat{G}_a \cong G_a + \frac{\Delta V_h}{V_h \cdot \tan(G_a)}$$

By the same reasoning, we get:

$$\hat{G}_b \cong G_b + \frac{\Delta V_h}{V_h \cdot \tan(G_b)}$$

Whence:

$$\Delta r \approx D \frac{\Delta V_h}{V_h} \left( \frac{1}{\tan(G_a)} - \frac{1}{\tan(G_b)} \right) \quad (3)$$

For example, if an error of 1% is made on the horizontal speed of movement of the carrier, this error, on a measurement of distance between two points at a transversal distance of 10 km from each other and at a distance of 100 km from the radar with a mean relative bearing 45°, results in an error of the order of 200 m.

To reduce this error of measurement on the distance between two points of a radar image, it is necessary to improve the precision on the speed of the carrier. In the above scenario, in order that the distance error may be smaller than 10 m, the speed of the carrier must be known to within 0,05%, which is very difficult.

In the prior art, the speed of the carrier is obtained either by means of a satellite navigation system (GPS) or by means of a radar working in a special mode known as the mode of determining the ground speed vector.

Figure 2:
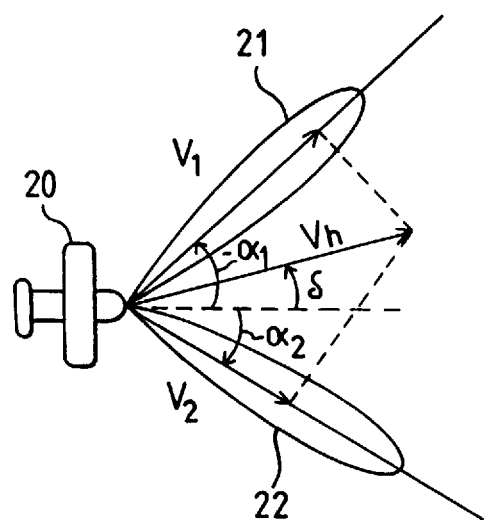
FIG. 2 is a drawing illustrating the usual way of estimating the ground speed by means of an airborne radar.

FIG. 2 illustrates the principle of operation of an airborne radar working in the mode of determining the speed vector of its carrier. The radar placed in the nose cone of an aircraft 20 makes two lateral sightings of the ground at high values of relative bearing $-\alpha_1$ and $\alpha_2$ and at a very small elevation angle β. During the first sighting operation, which takes place, for example on the left-hand side of the aircraft, at the relative bearing $-\alpha_1$, the beam 21 of the radar illuminates a portion of the ground which returns an echo assigned a frequency drift $F_{D\alpha 1}$ related to the Doppler effect due to the component $V_1$ of the horizontal speed of the carrier in the direction aimed at by the relationship:

$$1_{radar} = \frac{\lambda F_{D\alpha 1}}{2\cos\beta}$$

During the second sighting operation which takes place on the other side of the aircraft, the right-hand side in the example referred to, at the relative bearing $\alpha_2$, the beam 22 of the radar illuminates another portion of ground which returns an echo assigned a frequency drift $F_{d\alpha 2}$ related to the Doppler effect due to the component $V_2$ of the horizontal speed of the carrier in the direction aimed at by the relationship:

$$2_{radar} = \frac{\lambda F_{D\alpha 2}}{2\cos\beta}$$

A geometrical construction, that is simplified if the values of relative bearing $-\alpha_1$ and $\alpha_2$ are taken to be equal to $-\pi/4$ and $+\pi/4$, is used to determine the modulus and orientation of the ground speed vector from its projections $V_1$ and $V_2$ in the relative bearing values $-\alpha_1$ and $\alpha_2$. The orientation of the ground speed vector is not obligatorily identical to the longitudinal axis of the aaircraft 21 for there may be, as in the case shown in FIG. 2, a course drift angle $-\delta$ due to cross-wind. In addition to the modulus, this method of determination gives the direction of the ground speed of the aircraft, in doing so independently of the drift. However, it implements a priori knowledge of the values of relative bearing $-\alpha_1$ and $\alpha_2$ of the directions aimed at and, as the case may be, of the elevation angle β, if this angle is not negligible. This a priori knowledge brings into account the errors of locking of the radar with respect to the referential system of the aircraft. This is detrimental to the precision of the measurement.

It is useful to take advantage of the fact that, in a measurement of distance between two points of a radar image, it is not necessary to know the direction of the ground speed of the carrier and to use this fact to seek a mode of operation of the radar where it determines only that ground speed modulus which does not take account of the errors of the locking of the radar with respect to the referential system of the aircraft. This would improve the precision of the measurement and make it unnecessary to resort to a satellite navigation system.

To do this, it is proposed to achieve the lateral illumination, with the radar, of one and the same point of the ground at two successive instants $t_1$ and $t_2$ offset by a time interval T and, at each of these instants, to carry out the measurements of the distances $D_1$ and $D_2$, and of the Doppler frequency shifts $F_{d1}$ and $F_{d2}$ of the corresponding echoes.

For the rest of the description it shall be assumed, with a view to simplification, that the elevation angle —S at which the illuminated point of the ground is seen is very small, a few degrees at most, and that it may have its cosine approximated without difficulty by the value 1.

Figure 3:
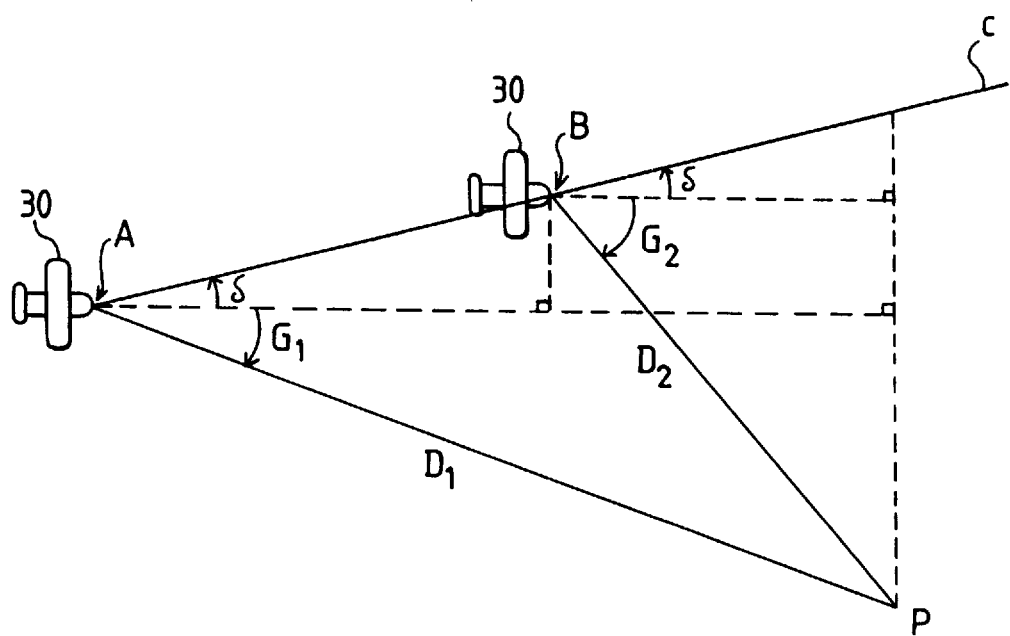
FIG. 3 is a drawing illustrating the way, according to the invention, to estimate the modulus of the ground speed by means of an airborne radar.

FIG. 3 illustrates this process of the illumination, by a radar borne by an aircraft 30, of one and the same point P of the ground, at two successive instants $t_1$ and $t_2$. The aircraft 30 follows a rectilinear path c. At the instant $t_1$, when its radar illuminates the point P of the ground for the first time, it is at the point A of its path c with an angle of drift $\lambda$; it sees the point P of the ground at a distance $D_1$ and at a relative bearing $G_1$. At the instant $t_2$, when its radar illuminates the point P of the ground for the second time, it has reached the point B of its path c with the same angle of drift $\lambda$ and sees the point P of the ground at a new distance $D_2$ and at a new relative bearing $G_2$.

The Doppler shift $F_{d2}$ of the echo following the illumination of the point P of the ground at the second instant $t_2$ corresponds to the relationship:

$$F_{d2} = \frac{2V_h}{\lambda} \cos(G_2 - \delta)$$

$\lambda$ being the wavelength of the microwave transmits by the radar. In expanding the cosine we get:

$$F_{d2} = \frac{2V_h}{\lambda} [\cos(G_2)\cos(\delta) + \sin(G_2)\sin(\delta)] \quad (4)$$

In observing that, according to the geometry of FIG. 3, it is possible to write:

$$\begin{cases} D_2\cos(G_2) = D_1\cos(G_1) - V_h \cdot T \cdot \cos(\delta) \\ D_2\sin(G_2) = D_1\sin(G_1) - V_h \cdot T \cdot \sin(\delta) \end{cases} \quad (5)$$

$V_h$ being the ground speed of the aircraft and T the interval of time between the instants $t_1$ and $t_2$. By then replacing the cosine $G_2$ and the sine $G_2$ in the relationship (4) by their values taken in the relationships (5), we get:

$$F_{d2} = \frac{2V_h}{\lambda} \times \frac{D_1}{D_2} \left[ \cos(G_1 - \delta) - \frac{V_h \cdot T}{D_1} \right]$$

In taking account of the fact that:

$$F_{d1} = \frac{2V_h}{\lambda} \cos(G_1 - \delta)$$

we get:

$$F_{d2} = \frac{D_1}{D_2} \left[ F_{d1} - \frac{2V_h^2 \cdot T}{\lambda \cdot D_1} \right]$$

We deduce therefrom:

$$V_h = \sqrt{\frac{\lambda}{2T} (D_1 \cdot F_{d1} - D_2 \cdot F_{d2})} \quad (6)$$

This expression of the ground speed of the carrier of the radar has the value of no longing bringing any relative bearing value into play and therefore of making the measurement independent of the locking of the radar to its carrier and of the drift of the course of the carrier.

The preceding expression does not give exactly the ground speed of the carrier of the radar but its component in the elevation angle of the sighting operation. This does not amount to any drawback for determining the distance between two points of a radar image, inasmuch as it is this component that comes into play in the computations:

The standard deviation of the errors of measurement of the modulus of the ground speed of the carrier of the radar by the application of the relationship (6) is given by the following formula:

$$\sigma V_h = \frac{\lambda}{4V_h \cdot T} \sqrt{\sigma D^2 \cdot (F_{d1}^2 + F_{d2}^2) + \sigma F_d^2 \cdot (D_1^2 + D_2^2)}$$

with:
$\sigma F_d$, the standard deviation of the measurement of Doppler shift frequency,
$\sigma_D$, the standard deviation of the measurement of distance Now; for an imaging radar, the precision of measurement of the Doppler shift frequency is generally chosen so that the resolution of the image is either isotropic or a radial resolution (along the distance axis) equal to the transversal resolution (along the axis of the Doppler frequencies). The standard deviation of the measurement of Doppler shift frequency is then equal to:

$$\sigma F_d = \frac{2V_h \cdot \sin(G_1)}{\lambda} \cdot \frac{\sigma D}{D_1}$$

If, furthermore, the time interval T between the two instants of measurement $t_1$ and $t_2$ is short enough for the distances and the Doppler shift frequencies to have undergone little variation, then the expression of the precision of the measurement of speed gets simplified:

$$\sigma V_h = \frac{\sigma D}{\sqrt{2} \cdot T}$$

This precision on the speed makes it possible to obtain a precision of distance measurement on an image, whose standard deviation $\sigma r$, deduced from the relationship (3) in overlooking the drift, is equal to:

$$\sigma r \approx D_1 \frac{\sigma D}{\sqrt{2} \cdot V_h \cdot T} \left( \frac{1}{\tan(G_a)} - \frac{1}{\tan(G_b)} \right)$$

If we take a precision of measurement of radar-target distance of 1 meter, and a speed of the carrier of the radar of 200 m/s, and if we assume that the two images of one and the same zone of the ground are taken at an interval of 10 s, then the precision of the measurement of distance between two points of the image goes from 200 m to 7 m.

The duration of the time interval between two shots of one and the same zone can be reduced while at the same time keeping the same precision of measurement, in using several points of reflection in the image to estimate the ground speed of the carrier. Then, there are as many assessments made of the ground speed of the carrier as there are points of reflection taken into account, and the mean of these assessments is taken, thus improving the precision. In the above example, the use of 100 points of reflection instead of one makes it possible to reduce the time interval from 10 s to 1 s for the same precision.

It can be noted that the acquisition of the signals needed for the formation of the radar image, by a SAR technique for example, and that of the measurements needed for the estimation of the modulus of the speed may be done at the same time. This makes it possible to perform the best corrections possible on the distances between points in the radar image.

The method of assessment of the modulus of the ground speed of the carrier of a radar that has just been described for a 2D radar can be extended to 3D radars, either by using the information from the difference channels in the case of the 3D interferometrical modes or by using a digital file describing the altitude of the ground in the case of 3D modes with a digital field file.

What is claimed is:

1. A method to determine a modulus of a speed of movement of a carrier of radar, comprising the steps of:

(a) illuminating a same zone on the ground laterally, with radar of the carrier, at times $t_1$ and $t_2$, (b) measuring respective distances $D_1$ and $D_2$ of the carrier to the same zone at the times $t_1$ and $t_2$, and Doppler frequency shifts $F_{d1}$ and $F_{d2}$ of respective echoes returned by the same zone during the times $t_1$ and $t_2$, and (c) deducing the modulus $|\vec{V}_h|$ of the speed of movement of the carrier based on a relationship:

$$|\vec{V}_h| = \sqrt{\frac{\lambda}{2(t_2 - t_1)} (D_1 \cdot F_{[d1]} - D_2 \cdot F_{d2})}$$

with $\lambda$ being a wavelength of a radar wave transmitted by the radar.

2. The method according to claim 1, further comprising the steps of:

(d) performing steps (a)–(c) for several points on the ground and (e) determining the modulus of the speed of movement of the carrier by taking a mean of results from the step (d).

3. The method according to claim 1, further comprising the steps of:

using radar signals received during SAR radar imaging to obtain a radar image, and (g) correcting errors of distances on points in the radar image based on Doppler frequencies and the modulus of the speed of movement of the carrier from step (c).

4. The method according to claim 2, further comprising the steps of:

(f) using radar signals received during SAR radar imaging to obtain a radar image, and (g) correcting errors of distances on points in the radar image based on Doppler frequencies and the modulus of the speed of movement of the carrier from step (e).

5. A system for determining a modulus of a speed of movement of a carrier of radar, comprising:

means for illuminating a same zone on the ground laterally, with radar of the carrier, at times $t_1$ and $t_2$, means for measuring respective distances $D_1$ and $D_2$ of the carrier to the same zone at the times $t_1$ and $t_2$, and Doppler frequency shifts $F_{d1}$ and $F_{d2}$ of respective echoes returned by the same zone during the times $t_1$ and $t_2$, and means for deducing the modulus $|\vec{V}_h|$ of the speed of movement of the carrier based on a relationship:

$$|\vec{V}_h| = \sqrt{\frac{\lambda}{2(t_2 - t_1)} (D_1 \cdot F_{[d1]} - D_2 \cdot F_{d2})}$$

with $\lambda$ being a wavelength of a radar wave transmitted by the radar.

6. The system according to claim 5, further comprising:

means for determining the modulus of the speed of movement of the carrier by taking a mean of results from the deducing means for several points on the ground.

7. The system according to claim 5, further comprising:

means for using radar signals received during SAR radar imaging to obtain a radar image, and means for correcting errors of distances on points in the radar image based on Doppler frequencies and the modulus of the speed of movement of the carrier from the deducing means.

8. The system according to claim 6, further comprising:

means for using radar signals received during SAR radar imaging to obtain a radar image, and means for correcting errors of distances on points in the radar image based on Doppler frequencies and the modulus of the speed of movement of the carrier from the determining means.

* * * * *